M. A. CARTER.
CHAIN MAT FOR RESILIENT TIRES.
APPLICATION FILED NOV. 7, 1912.
1,065,214.
Patented June 17, 1913.
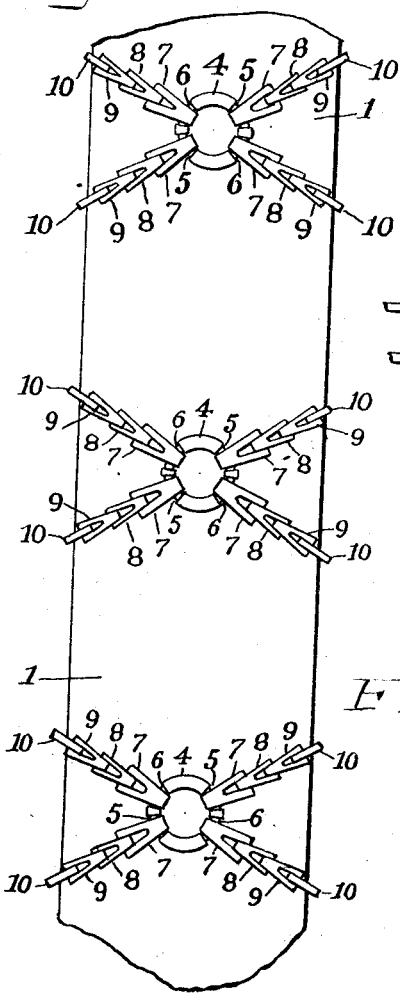
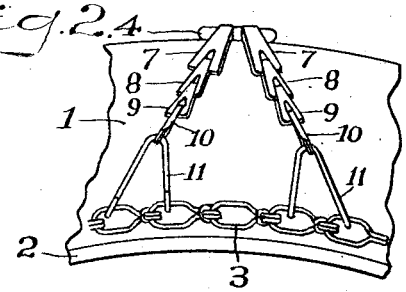
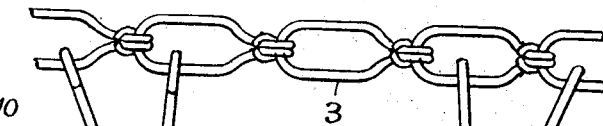
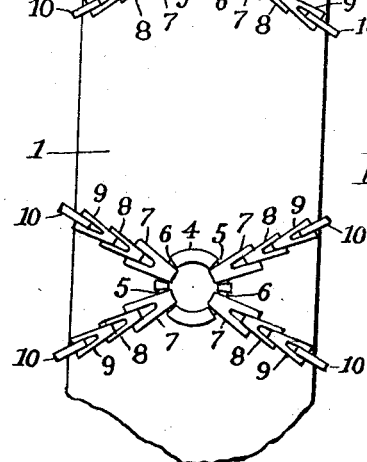
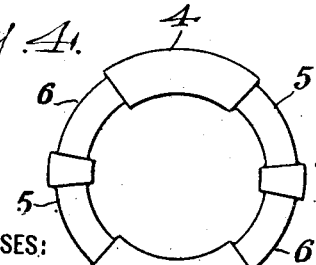
WITNESSES:
INVENTOR
Maurice A. Carter.
BY
ATTORNEY

UNITED STATES PATENT OFFICE.

MAURICE A. CARTER, OF GRANVILLE, NEW YORK, ASSIGNOR TO THE WALKER TIRE CHAIN COMPANY, OF TOLEDO, OHIO.

CHAIN MAT FOR RESILIENT TIRES.

1,065,214.

Specification of Letters Patent.   Patented June 17, 1913.

Application filed November 7, 1912. Serial No. 730,004.

*To all whom it may concern:*

Be it known that I, MAURICE A. CARTER, a citizen of the United States, residing at Granville, county of Washington, State of New York, have invented certain new and useful Improvements in Chain Mats for Resilient Tires; and I do declare the following to be a full, clear, and exact description of the invention, such as will enable others skilled in the art to which it appertains to make and use the same.

My invention has reference to certain improvements in chain mats such as are adapted to be applied to the resilient tires of wheels, and has for its object to improve on the construction shown and described in U. S. Letters Patent No. 911,427, issued February 2, 1909, to Burke Judson Morehouse. In the construction set forth in said Letters Patent one of the objects aimed at was to prevent the mat from crawling circumferentially of the tire during the travel of a vehicle whose tires were equipped with such mats, but the cross chains set forth in said patent were composed of twisted wire links which were capable of an axial rolling movement and which from their very construction could not lie flat against the tire; also, in said patented construction the rings located in the center of the tread of the tire were connected to the twisted cross chains in such manner that said rings were capable of an axial turning. While the chain mat shown and described in said Letters Patent has proved exceedingly efficient, nevertheless, when it is improperly applied to a tire, a certain amount of creeping action is possible owing to the nature of the cross chains and to their connection with the tread rings, and it is the especial object of the present invention to correct these defects and to provide a chain mat which cannot possibly creep circumferentially of the tire, and with this end in view my invention consists in certain details of construction and combination of parts hereinafter fully set forth and then particularly pointed out in the claims which conclude this description.

In the accompanying drawing Figure 1 is a broken front elevation of a tire equipped with my improvement—Fig. 2 a broken side elevation of the same—Fig. 3 a detail schematic view of my improved chain mat, and Fig. 4 a detail plan view of one of the rings.

Similar numerals of reference denote like parts in the several figures of the drawing.

1 represents the tire and 2 the rim of the wheel to which the tire is applied.

My improved mat comprises two side chains 3 formed of any approved style of link and of such length as to extend entirely around the sides of the tire, the extremities of said chains being provided with any suitable and ordinary locking devices (not shown), so that said chains may be properly tightened and secured in position in the usual manner.

4 are rings made of suitable metal which lie snugly against the tread of the tire at suitable intervals, and the metal which forms these rings is reduced in thickness so as to provide two pairs of recesses 5, 6, at diametrically opposite points of the ring. That is to say, the recesses 5 are diametrically opposite each other while the recesses 6 are likewise diametrically opposite each other.

7 are flat links made of sheet metal whose bow portions embrace the rings within the recesses 5, 6, so as to fit snugly therein and yet be capable of free rocking movements around the rings, and connected to these links in the usual manner are other flat sheet metal links 8, 9, which likewise lie flat against the periphery of the tire, and to the links 9 are connected twisted terminal links 10.

11 are double anchor hooks which are carried by the extremities of the links 10, the two hooks of each of these elements 11 being secured to adjoining links of the side chains 3, so that it will be clearly understood that the cross chains composed of the links 7, 8, and 9 are secured at their outer extremities to the rings 4 in such manner as to be incapable of any axial or rocking movements while at their inner ends said chains are secured to the side chains at two locations thereby also preventing any rocking or axial movement of these cross chains.

The twisted links 10, in assembled position on a tire, are located at the side portions thereof so that said links never come in contact with the ground so as to become wrenched and impart a tendency toward an axial or rolling movement of the cross chains, and while I prefer to use these twisted links since they afford a very convenient means for attaching the anchor hooks 11 nevertheless I do not wish to be limited in this respect since other devices may be employed in this connection all within the range of ordinary mechanical skill and requiring no invention. The rings all occupy substantially one vertical plane on the tire, and as these rings project a quarter of an inch or more beyond the periphery of the tire they will themselves tend to prevent skidding of a vehicle equipped with my improvement, provided that they are held firmly to the tire without any creeping action of the mat as a whole.

The cross chains being made flat and of sheet metal and confined at their extremities in the manner hereinbefore described, cannot roll or have any axial movement, and as these cross chains extend from the rings at diametrically opposite locations the tendency to creep circumferentially of the tire is resisted to a marked degree, and right in this connection I desire to call attention to the fact that there can be no whipping of the cross chains and rings against the ground in advance of the contact of the tire therewith such as is common in tire armor or chains now in general use and which mainly contributes toward this creeping of the chain. Since there can be no rolling or axial movement of the cross chains and rings, the wear on the same by constant usage will be fairly uniform so that my improved chain mat is reversible, and this is an advantage which is very material and which cannot attach to cross chains of twisted wire links which do not lie snugly against the tire and which are continually crawling around the periphery thereof. Also, a chain mat made in accordance with my present improvement, will not only give a good and safe traction on all kinds of roads and at any desired speed, but the wear on the tires caused by the mat itself is reduced to a minimum.

By referring to Figs. 1 and 3 of the drawings it will be observed that the rings 4 lie flat and centrally on the tread of the tire and that the seats 5 thereof are so disposed that they prevent the cross chains rotating axially and hold the anchored ends of said chains so that when the cross chains are attached to the side chains 3, said cross chains are retained in radiating relation. By this arrangement it will be clear that rolling of the chains is prevented and also that as the chains exert pulling strains on the rings 4 in opposite directions, movements of said rings are prevented.

Having thus described my invention what I claim as new and desire to secure by Letters Patent is:—

1. A chain mat for resilient tires comprising side chains, tread pieces presenting closed open-centered outlines to the tire, and securing chains for each tread piece secured to either side chain at remote points and to each tread piece at fixed locations.

2. A chain mat for resilient tires comprising side chains, ring shaped tread pieces having opposite portions thereof reduced to provide two pairs of anchor seats, the members of each pair of seats being arranged in spaced relation, and securing chains having one of their ends fixed to said seats to prevent movement on the tread pieces and their other ends connected to the side chains at remote locations.

3. A chain mat for resilient tires comprising side chains, tread pieces presenting closed open-centered outlines to the tire, and securing chains formed of flat links for each tread piece secured to either side chain at remote points and to each tread piece at fixed locations.

In testimony whereof, I affix my signature in presence of two witnesses.

MAURICE A. CARTER.

Witnesses:
MILFORD D. WHEDON,
MORFUDD WILLIAMS.